US008878961B2

(12) United States Patent
Endo

(10) Patent No.: US 8,878,961 B2
(45) Date of Patent: Nov. 4, 2014

(54) IMAGE SENSING APPARATUS AND METHOD OF CONTROLLING SAME

(71) Applicant: FUJIFILM Corporation, Tokyo (JP)

(72) Inventor: Maiko Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/265,427

(22) Filed: Apr. 30, 2014

(65) Prior Publication Data
US 2014/0232907 A1 Aug. 21, 2014

Related U.S. Application Data

(63) Continuation of application No. PCT/JP2012/078458, filed on Nov. 2, 2012.

(30) Foreign Application Priority Data

Nov. 8, 2011 (JP) ................................. 2011-244244

(51) Int. Cl.
*H04N 5/262* (2006.01)
*H04N 5/208* (2006.01)
*H04N 5/232* (2006.01)

(52) U.S. Cl.
CPC ................................. *H04N 5/23296* (2013.01)
USPC .................. 348/240.1; 348/240.2; 348/240.3; 348/252

(58) Field of Classification Search
USPC .................... 348/240.1–240.3, 252
See application file for complete search history.

(56) References Cited

U.S. PATENT DOCUMENTS

| 5,838,371 A | 11/1998 | Hirose et al. |
| 6,538,694 B1 | 3/2003 | Miyahara et al. |
| 2006/0038920 A1 | 2/2006 | Kondo et al. |
| 2007/0296837 A1 | 12/2007 | Morita |
| 2008/0278602 A1 | 11/2008 | Otsu |

FOREIGN PATENT DOCUMENTS

| JP | 3-218173 A | 9/1991 |
| JP | 6-261238 A | 9/1994 |
| JP | 11-168653 A | 6/1999 |
| JP | 11-239294 A | 8/1999 |
| JP | 2000-156816 A | 6/2000 |
| JP | 2004-187050 A | 7/2004 |
| JP | 2004-191856 A | 7/2004 |

(Continued)

OTHER PUBLICATIONS

International Search Report issued in PCT/JP2012/078458, mailed on Dec. 4, 2012.

(Continued)

*Primary Examiner* — Joel Fosselman
(74) *Attorney, Agent, or Firm* — Birch, Stewart, Kolasch & Birch, LLP

(57) ABSTRACT

If zoom magnification falls within an optical-zoom application scaling range of zoom magnifications $Z_1$ to $Z_2$, image data that has been enlarged by a zoom lens is recorded on a recording medium. If zoom magnification falls within an electronic-zoom application scaling range of zoom magnifications $Z_2$ to $Z_3$, the image data is subjected to super-resolution processing, super-resolution image data and image data that has not been subjected to super-resolution processing are combined by weighting processing executed such that the higher the zoom magnification, the greater the weight assigned to the super-resolution image data, and the resultant image data is subjected to electronic zoom processing and then recorded. If zoom magnification exceeds $Z_3$, the super-resolution image data is recorded upon being subjected to electronic zoom processing.

13 Claims, 8 Drawing Sheets

(56) References Cited

FOREIGN PATENT DOCUMENTS

| | | |
|---|---|---|
| JP | 2005-20061 A | 1/2005 |
| JP | 2005-62633 A | 3/2005 |
| JP | 2006-32576 A | 2/2006 |
| JP | 2007-135133 A | 5/2007 |
| JP | 2007-329685 A | 12/2007 |
| JP | 2008-283442 A | 11/2008 |

OTHER PUBLICATIONS

PCT/ISA/237—Issued in PCT/JP2012/078458 mailed on Dec. 4, 2012.

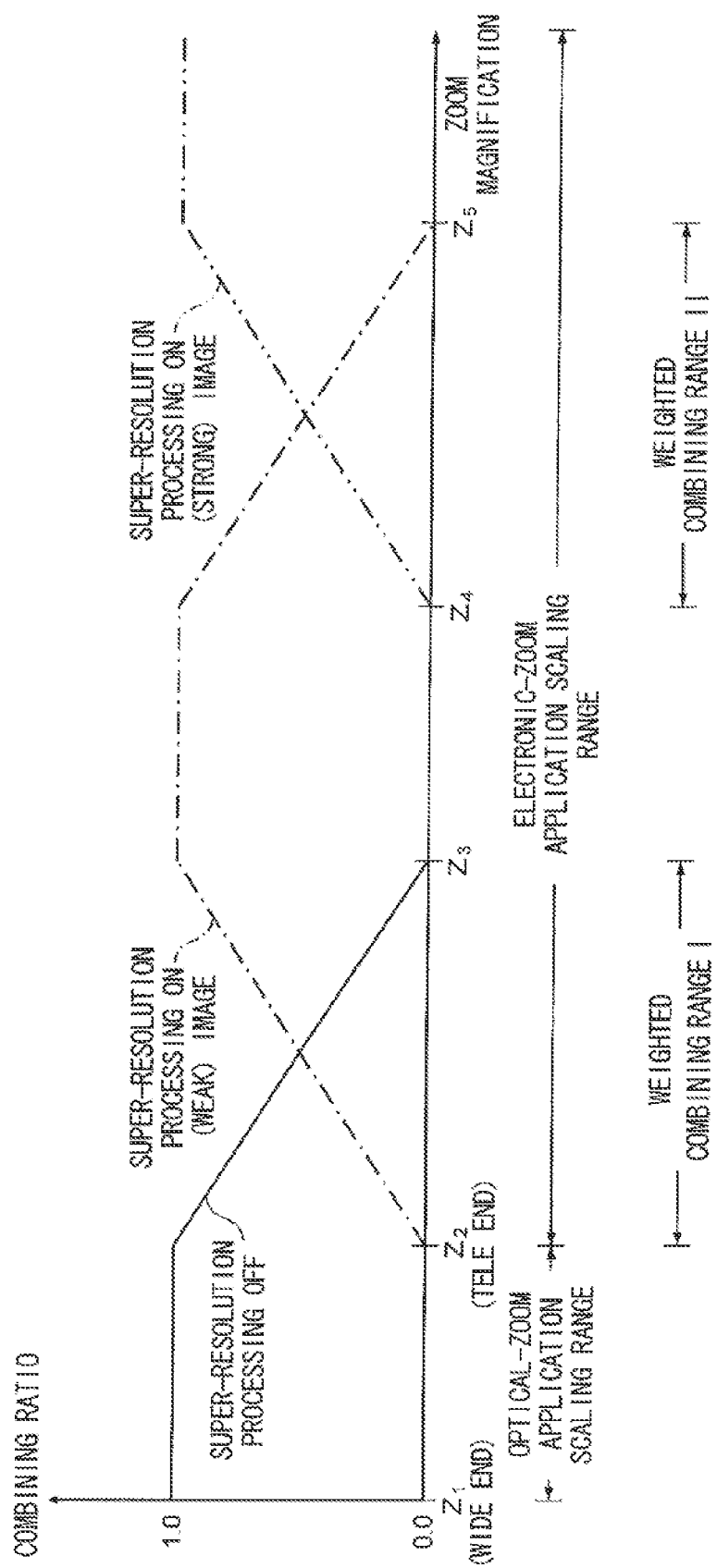

IMAGE SENSING APPARATUS AND METHOD OF CONTROLLING SAME

CROSS REFERENCE TO RELATED APPLICATIONS

This application is a continuation of PCT International Application No. PCT/JP2012/078458 filed on Nov. 2, 2012, which claims priority under 35 U.S.C. 119(a) to Application No. 2011-244244 filed on Nov. 8, 2011 in Japan, all of which are hereby expressly incorporated by reference into the present application.

BACKGROUND OF THE INVENTION

1. Field of the Invention

This invention relates to an image sensing apparatus and to a method of controlling this apparatus. More particularly, the invention relates to an image sensing apparatus equipped with both an optical zoom function and an electronic zoom function, and to a method of controlling this image sensing apparatus.

2. Description of the Related Art

The prior art includes an apparatus which, when a zoom switch is operated, transitions from optical zoom to electronic zoom to thereby display on a display device an enlarged image the magnification of which exceeds the maximum magnification provided by optical zoom. Also known is an apparatus that displays an electronically zoomed image between optical-zoom magnifications that change in stepwise fashion (see Patent Documents 1 and 2).

An electronically zoomed image has a resolution that, in general, is inferior to that of an optically zoomed image. There is also an apparatus in which an image-contour correction is performed in accordance with the zoom magnification in order to maintain resolution (the sharpness of contours, for example) in an electronically zoomed image (see Patent Documents 3, 4 and 5).

Patent Document 1: Japanese Patent Application Laid-Open No. 2006-32576

Patent Document 2: Japanese Patent Application Laid-Open No. 2005-62633

Patent Document 3: Japanese Patent Application Laid-Open No. 2005-20061

Patent Document 4: Japanese Patent Application Laid-Open No. 11-168653

Patent Document 5: Japanese Patent Application Laid-Open No. 3-218173

Patent Documents 3 to 5 change the strength of contour correction processing, which is executed with respect to image data, or the frequency hand for executing this contour correction processing, in accordance with the magnification of electronic zoom. However, contour correction processing suited to an electronically zoomed image is applied even to image data that has not been electronically zoomed and whose resolution is satisfactory, there is the danger that, contrary to expectation, degradation of the image-quality characteristic, such as the appearance of artifacts and blurring, will occur.

SUMMARY OF THE INVENTION

An object of the present invention is to arrange it so that image data that has been subjected to super-resolution processing (described later) is generated only if image correction processing, particularly super-resolution processing, is necessary.

Another object of the present invention is to enable the generation of image data that represents an image exhibiting excellent resolution over a wide range of zooming.

An image sensing apparatus according to a first aspect of the present invention comprises: an image sensing device (image sensing means) for imaging a subject through a zoom lens, which is capable of optically scaling a light image, and outputting image data representing the image of the subject; an electronic zoom device (electronic zoom means) for electronically scaling the image data obtained by the image sensing device; a zoom operating device (zoom operating means) for performing an operation for changing zoom magnification of the zoom lens and of the electronic zoom device; a zoom control device (zoom control means) for scaling the image data using only the zoom lens if the zoom magnification is within an optical-zoom application scaling range that extends up to a maximum optical zoom magnification which prevails when the zoom lens is situated at a telephoto end, and making joint use of the electronic zoom device if the zoom magnification is within an electronic-zoom application scaling range that exceeds the maximum optical zoom magnification; a super-resolution processing device (super-resolution processing means) for subjecting the image data to super-resolution processing that emphasizes contours while suppressing emphasis of noise, thereby generating super-resolution image data; and a weighted combining device (weighted combining means) for combining the generated super-resolution image data and image data, which has not been subjected to super-resolution processing, by weighting processing executed such that the higher the zoom magnification, the greater the weight assigned to the super-resolution image data, this being performed when the zoom magnification is within the electronic-zoom application scaling range.

The first aspect of the present invention also provides a method suited to control of the above-described image sensing apparatus. Specifically, the first aspect of the present invention provides a method of controlling an image sensing apparatus having an image sensing device (image sensing means) for imaging a subject through a zoom lens, which is capable of optically scaling a light image, and outputting image data representing the image of the subject; an electronic zoom device (electronic zoom means) for electronically scaling the image data obtained by the image sensing device; a zoom operating device (zoom operating means) for performing an operation for changing zoom magnification of the zoom lens and of the electronic zoom device; a zoom control device (zoom control means) for scaling the image data using only the zoom lens if the zoom magnification is within an optical-zoom application scaling range that extends up to a maximum optical zoom magnification which prevails when the zoom lens is situated at a telescopic end, and making joint use of the electronic zoom device if the zoom magnification is within an electronic-zoom application scaling range that exceeds the maximum optical zoom magnification; and a super-resolution processing device (super-resolution processing means) for subjecting the image data to super-resolution processing that emphasizes contours while suppressing emphasis of noise, thereby generating super-resolution image data; the method having a step of combining generated super-resolution image data and image data, which has not been subjected to super-resolution processing, by weighting processing executed such that the higher the zoom magnification, the greater the weight assigned to the super-resolution image data, this being performed when the zoom magnification is within the electronic-zoom application scaling range.

When zooming of the image of a subject is started using the zoom operating device, optical zooming (changing of focal length) by the zoom lens is carried out first. Optical zooming alone is performed up to the zoom magnification (maximum optical zoom magnification, maximum focal length of the zoom lens) which prevails when the zoom lens with which the image sensing apparatus is equipped is situated at the telephoto end. When zooming is performed up to a zoom magnification that exceeds the maximum optical zoom magnification, electronic zoom processing, which scales the image data electronically by pixel interpolation processing, starts. Zooming continues based upon a zoom magnification that exceeds the maximum zoom magnification of the zoom lens.

In this specification, "super-resolution processing" signifies subjecting image data to processing that emphasizes contours while suppressing emphasis of noise. Specifically, a super-resolution processing device image processing that raises the resolution of an image visually recognized in an image represented by image data to undergo processing; it is image processing that includes at least noise reduction (suppression, elimination) processing and contour emphasis processing. For example, super-resolution processing is a combination of noise reduction processing, which is based upon smoothing using a smoothing filter, and contour emphasizing processing for raising the gain of a luminance value exhibited by a contour component in an image. By subjecting image data to super-resolution processing, an image that has undergone zoom processing can be made an image (namely one exhibiting sharper contours and an inconspicuous degree of noise) having a resolution higher than that of an image that has not undergone super-resolution processing.

According to the first aspect of the present invention, weighted combining is carried out. This processing, which is executed when zoom magnification is within the electronic-zoom application scaling range, combines super-resolution image data and image data, which has not been subjected to super-resolution processing, by such weighting processing that the higher the zoom magnification, the greater the weight assigned to the super-resolution image data. This makes it possible to generate weighted and combined image data in which the weight (ratio) of image data that has undergone super-resolution processing gradually increases as zoom magnification rises as compared with weighted and combined image data in which the weight of image data that has not undergone super-resolution processing is large at a comparatively low zoom magnification in the electronic-zoom application scaling range. In the electronic-zoom application scaling range, the higher the zoom magnification, the more image resolution declines, as mentioned above. By gradually enlarging the weight of super-resolution-processed image data as zoom magnification increases, a decline in resolution can be suppressed over the full range of zoom operations to thereby enable the photographer to visually recognize an image in which the resolution is comparatively constant. Further, by not generating weighted and combined image data in which the weight of super-resolution-processed image data is suddenly enlarged at the moment of a changeover from the optical-zoom application scaling range to the electronic-zoom application scaling range, a sudden change in resolution is mitigated.

Preferably, the image sensing apparatus further comprises a recording control device (recording control means) operable if zoom magnification is within the optical-zoom application scaling range for recording in a recording device (recording medium) image data that has been optically scaled to the zoom magnification and not subjected to super-resolution processing, and operable if zoom magnification is within the electronic-zoom application scaling range for recording in the recording device the weighted and combined image data upon electronically scaling this weighted and combined image data to the zoom magnification. Image data that has been recorded in the recording device can be used in presenting an image display on a display device. Weighted and combined image data can be scaled to a zoom magnification by electronic zoom processing or, prior to weighted combining, super-resolution image data and image data that has not been subjected to super-resolution processing can be scaled to the zoom magnification by electronic zoom processing and then weighted and combined subsequently. If zoom magnification extends up to the maximum optical zoom magnification (is within the optical-zoom application scaling range), optically scaled image data that has not undergone super-resolution processing is recorded in the recording device. On the other hand, when the zoom magnification exceeds the maximum optical zoom magnification and is a zoom magnification for which electronic zoom processing should be applied to the image data (i.e., is a zoom magnification within the electronic-zoom application scaling range), as mentioned above, image data that includes super-resolution image data is recorded in the recording device.

If zoom magnification is within the optical-zoom application scaling range, image data, which has been scaled to this zoom magnification and has not undergone super-resolution processing, is recorded in the recording device, as set forth above. In this embodiment, the image sensing apparatus further comprises a super-resolution processing control device (super-resolution processing control means) for controlling the super-resolution processing device so as to not execute super-resolution processing if zoom magnification is within the optical-zoom application scaling range and to subject image data to super-resolution processing when the zoom magnification is within the electronic-zoom application scaling range. Thus, in the optical-zoom application scaling range, the resources of the image sensing apparatus are not expended super-resolution processing and the time it takes to display an image is not prolonged.

In another embodiment, the weighted combining device subjects super-resolution image data and image data that has not been subjected to super-resolution processing to weighting processing when zoom magnification is within a range extending from the maximum optical zoom magnification to a first zoom magnification that exceeds the maximum optical zoom magnification. The recording control device is operable if zoom magnification is within the range extending from the maximum optical zoom magnification to the first zoom magnification for recording in the recording device the weighted and combined image data upon electronically scaling this weighted and combined image data to the zoom magnification, and operable in a case where zoom magnification exceeds the first zoom magnification for recording in the recording device the super-resolution image data upon electronically scaling this weighted and combined image data to the zoom magnification.

The super-resolution processing device may be made to execute two different degrees of super-resolution processing. In another embodiment according to the first aspect of the present invention, the super-resolution processing device executes first and second super-resolution processing operations having different degrees of super-resolution processing. The weighted combining device weights and combines super-resolution image data resulting from the first super-resolution processing operation and image data, which has not been subjected to super-resolution processing, by weighting processing executed such that the higher the zoom magnification, the greater the weight assigned to the super-resolution image data, this being performed the zoom magnification is within a range extending from the maximum optical zoom magnification to a first zoom magnification that exceeds the maximum optical zoom magnification, and weights and combines super-resolution image data resulting from the first super-resolution processing operation and super-resolution image data resulting from the second super-resolution processing operation, the strength of which is greater than that of the first super-resolution processing operation, by weighting processing executed such that the higher the zoom magnification, the greater the weight assigned to the super-resolution image data resulting from the second super-resolution processing operation, this being performed if the zoom magnification is within a range extending from a second zoom magnification that exceeds the first zoom magnification to a third zoom magnification that exceeds the second zoom magnification. The recording control device is operable if zoom magnification is within the range extending from the maximum optical zoom magnification to the first zoom magnification for recording in the recording device the image data, which has been obtained by weighting and combining the super-resolution image data resulting from the first super-resolution processing operation and the image data that has not been subjected to super-resolution processing, upon electronically scaling this weighted and combined image data to the zoom magnification; is operable if zoom magnification is within the range extending from the first zoom magnification to the second zoom magnification for recording in the recording device the super-resolution image data resulting from the first super-resolution processing operation upon electronically scaling this weighted and combined image data to the zoom magnification; is operable if zoom magnification is within the range extending from the second zoom magnification to the third zoom magnification for recording in the recording device image data, which has been obtained by weight and combining the super-resolution image data resulting from the first super-resolution processing operation and the image data resulting from the second super-resolution processing operation noon electronically scaling this weighted and combined image data to the zoom magnification; and is operable in a case where zoom magnification exceeds the third zoom magnification for recording in the recording device the super-resolution image data resulting from the second super-resolution processing operation upon electronically scaling this weighted and combined image data to the zoom magnification.

The zoom magnification that initiates super-resolution processing (the combining of super-resolution image data) may be the minimum zoom magnification of the electronic-zoom application scaling range (namely the boundary between the optical-zoom application scaling range and the electronic-zoom application scaling range). Naturally, super-resolution processing need not necessarily start from the minimum zoom magnification of the electronic-zoom application scaling range. In an embodiment, the image sensing apparatus further comprises a weighted combining control device (weighted combining control means) for controlling the weighted combining device such that super-resolution image data is not combined if zoom magnification is equal to or less than a prescribed zoom magnification, even if the zoom magnification is within the electronic-zoom application scaling range, and such that image data is combined when the zoom magnification is greater than the prescribed zoom magnification. When the zoom magnification gradually increases, it exceeds the boundary between the optical-zoom application scaling range and the electronic-zoom application scaling range. Then, when the zoom magnification attains the prescribed zoom magnification in the electronic-zoom application scaling range, the super-resolution image data is combined. The reason for adopting such processing this is that, although the zoom magnification may be within the electronic-zoom application scaling range, if the zoom magnification is in low region of this range, there are instances where image resolution will not undergo much deterioration.

The prescribed zoom magnification mentioned above is one at which a spatial frequency response at a predetermined reference spatial frequency takes on a prescribed value. For example, use can be made of a zoom magnification at which a response that is N % (where N is an positive value) of a spatial frequency response, which is decided by the characteristics of the image sensing apparatus and the zoom magnification, is obtained with regard to a predetermined reference spatial frequency. Further, there is a spatial frequency at which a predetermined reference spatial frequency response N % is obtained. A zoom magnification at which this spatial frequency falls below a reference spatial frequency may be used as the prescribed zoom magnification mentioned above.

In another embodiment according to the first aspect of the present invention, the super-resolution processing device includes a separation device (separation means) for separating an image, which is represented by image data, into a contour component and a non-contour component; a contour-component processing device (contour-component processing means) for applying noise reduction processing and emphasis processing to the contour component into which the image is separated by the separation device; and a combining device (combining means) for combining the contour component, which has undergone noise reduction processing and emphasis processing, with the non-contour component. The processing time needed for super-resolution processing is shortened by adopting the contour component as the object of super-resolution processing. In addition, the occurrence of false contours can be suppressed.

An image sensing apparatus according to a second aspect of the present invention comprises: an image sensing device (image sensing means) for imaging a subject through a zoom lens, which is capable of optically scaling a light image, and outputting image data representing the image of the subject; an electronic zoom device (electronic zoom means) for electronically scaling the image data obtained by the image sensing device; a zoom operating device (zoom operating means) for performing an operation for changing zoom magnification of the zoom lens and of the electronic zoom device; a zoom control device (zoom control means) for scaling the image data using only the zoom lens if the zoom magnification is within an optical-zoom application scaling range that extends up to a maximum optical zoom magnification which prevails when the zoom lens is situated at a telephoto end, and making joint use of the electronic zoom device if zoom magnification is within an electronic-zoom application scaling range that exceeds the maximum optical zoom magnification; a super-resolution processing device (super-resolution processing means) for subjecting the image data to super-resolution processing that emphasizes contours while suppressing emphasis of noise, thereby generating super-resolution image data; a weighted combining device (weighted combining means) for combining the generated super-resolution image data and image data, which has not been subjected to super-resolution processing, by weighting processing executed such that the higher the zoom magnification, the greater the weight assigned to the super-resolution image data; and a recording control device (recording control means) for recording in a recording device (recording medium) image data that has been scaled to the zoom magnification and not subjected to super-resolution processing, this being performed if zoom magnification is equal to or less than a zoom magnification at which a spatial frequency response, which is decided by characteristics of the image sensing apparatus and the zoom magnification, takes on a prescribed value with regard to a predetermined standard spatial frequency, and for recording in the recording device image data, which has been obtained by weighting and combining the super-resolution image data and the image data that has not been subjected to super-resolution processing, upon scaling this weighted and combined image data to the zoom magnification, this being performed in a case where zoom magnification is greater than the zoom magnification at which the spatial frequency response takes on the prescribed value. For example, it is possible to use, as a zoom magnification at which the above-mentioned spatial frequency response attains a prescribed value, a zoom magnification at which a response that is N % (where N is an positive value) of a spatial frequency response, which is decided by the characteristics of the image sensing apparatus and the zoom magnification, is obtained with regard to a predetermined reference spatial frequency. Further, there is a spatial frequency at which a predetermined reference spatial frequency response N % is obtained. A zoom magnification at which this spatial frequency falls below a reference spatial frequency may be used.

The second aspect of the present invention also provides a method suited to control of the above-described image sensing apparatus. Specifically, the second aspect of the present invention provides a method of controlling an image sensing apparatus having an image sensing device (image sensing means) for imaging a subject through a zoom lens, which is capable of optically scaling a light image, and outputting image data representing the image of the subject; an electronic zoom device (electronic zoom means) for electronically scaling image data obtained by the image sensing device; a zoom operating device (zoom operating means) for performing an operation for changing zoom magnification of the zoom lens and of the electronic zoom device; a zoom control device (zoom control means) for scaling the image data using only the zoom lens if the zoom magnification is within an optical-zoom application scaling range that extends up to a maximum optical zoom magnification which prevails when the zoom lens is situated at a telescopic end, and making joint use of the electronic zoom device if the zoom magnification is within an electronic-zoom application scaling range that exceeds the maximum optical zoom magnification; and a super-resolution processing device (super-resolution processing means) for subjecting the image data to super-resolution processing that emphasizes contours while suppressing emphasis of noise, thereby generating super-resolution image data; the method having steps of combining the generated super-resolution image data and image data, which has not been subjected to super-resolution processing, by weighting processing executed such that the higher the zoom magnification, the greater the weight assigned to the super-resolution image data; and recording in a recording device image data that has been scaled to the zoom magnification aria not subjected to super-resolution processing, this being performed if zoom magnification is equal to or less than a zoom magnification at which a spatial frequency response, which is decided by characteristics of said image sensing apparatus and the zoom magnification, takes on a prescribed value with regard to a predetermined standard spatial frequency, and recording in the recording device image data, which has been obtained by weighting and combining the super-resolution image data and the image data that has not been subjected to super-resolution processing, upon scaling this weighted and combined image data to the zoom magnification, this being performed in a case where zoom magnification is greater than the zoom magnification at which the spatial frequency response takes on the prescribed value.

In accordance with the present invention, a spatial frequency response representing the resolution of an image is used as a criterion for determining whether to record image data, which has not been subjected to super-resolution processing, in the recording device or to record image data, which is obtained by weighting and combining the super-resolution image data and image data that has not been subjected to super-resolution processing, in the recording device. The spatial frequency response is determined by the characteristics (such as the optical characteristic of the zoom lens, characteristic of the image sensing device and image processing characteristic at the time of electronic zooming) of the image sensing apparatus and the zoom magnification. Further, the spatial frequency response declines as the zoom magnification increases. Use is made of a zoom magnification at which the spatial frequency response takes on a prescribed value, e.g., an N % response (where N is any positive value), with regard to a predetermined reference spatial frequency (this zoom magnification shall be referred to below as an "N % response zoom magnification"). If the zoom magnification is equal to or less than the N % response zoom magnification, then the image data at this time is such that its spatial frequency response will be greater than N %. Therefore, the image data that has not been subjected to super-resolution processing is recorded in the recording device based upon a consideration that this image data has an allowable resolution. On the other hand, if the zoom magnification is greater than the N % response zoom magnification, then the image data at this time is such that the spatial frequency response will be less than N %. Therefore, it is considered that an allowable resolution will not be achieved and, hence, image data obtained by weighting and combining the super-resolution image data and the image data that has not been subjected to super-resolution processing is recorded in the recording device. Thus, the photographer is allowed to visually recognize an image of excellent resolution over the full range of zooming operations. As mentioned above, use may be made of a zoom magnification at which the spatial frequency, where the response becomes the predetermined reference spatial frequency response N %, falls below the reference spatial frequency.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8, which shows a fourth embodiment of the present invention, illustrates the relationship between zoom magnification and processing for combining a super-resolution-processed image (an image for which super-resolution processing is ON) and an image that has not been subjected to super-resolution processing (an image for which super-resolution processing is OFF).

DESCRIPTION OF THE PREFERRED EMBODIMENTS

First Embodiment

Figure 1:
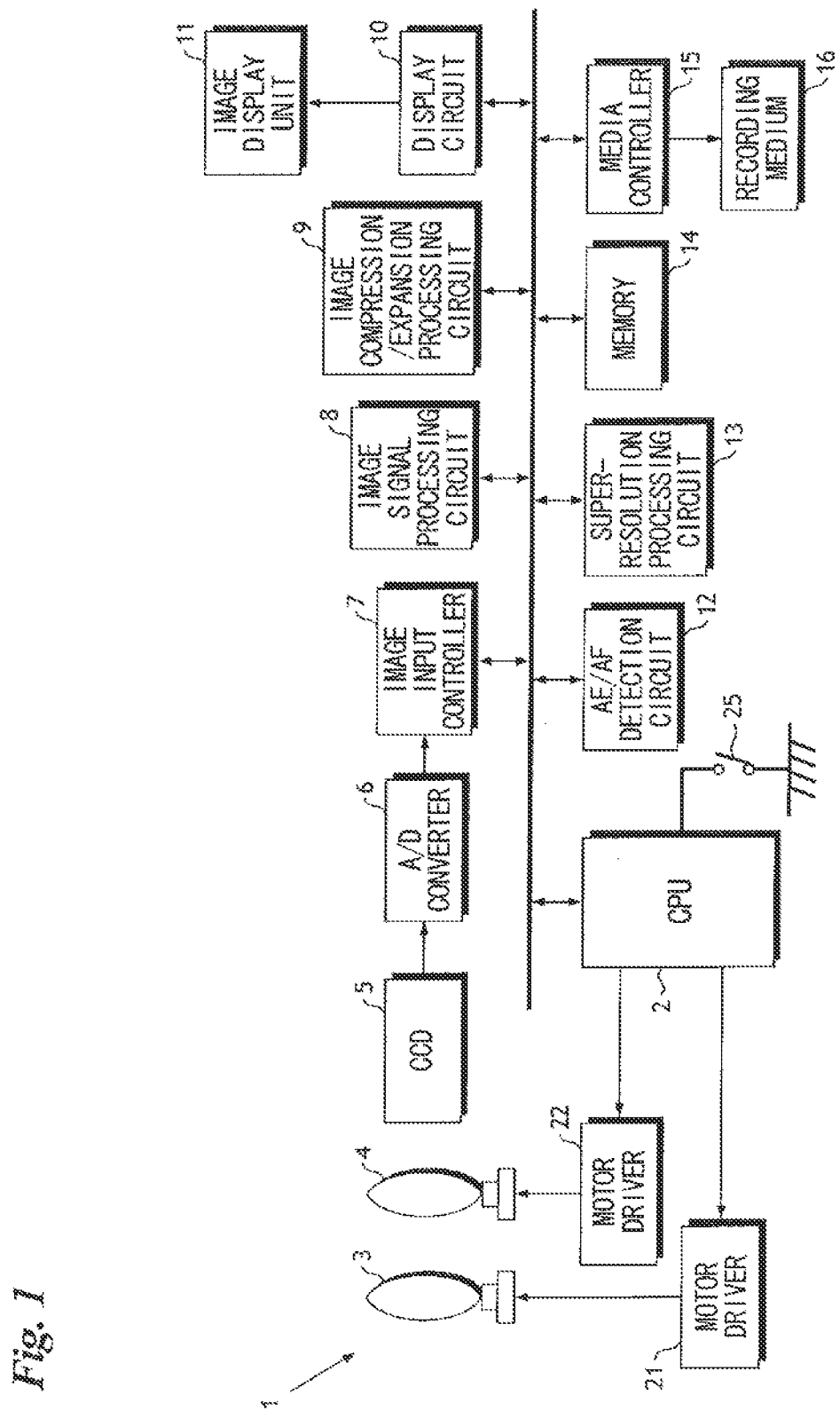
FIG. 1 is a block diagram illustrating the electrical configuration of a digital camera according to a first embodiment of the present invention.

FIG. 1 is a block diagram illustrating the electrical configuration of a digital camera 1 according to a first embodiment of the present invention.

The overall operation of the digital camera 1 is controlled by a CPU 2.

A control program executed by the CPU 2, various data necessary for control, and camera settings and the like have been stored in a memory 14 (a ROM area). The memory 14 is further used as a working area of the CPU 2 and as a temporary storage area for image data (a RAM area).

An operating unit 25 includes a mode selection dial, a shutter-release button and a zoom button, etc. When an imaging mode is set by the mode selection dial included the operating unit 25, light rays representing the image of a subject impinge upon the photoreceptor surface of a CCD 5 through a zoom lens 3 and a focusing lens 4. A video signal representing the image of the subject is output from the CCD 5 at a fixed period. When the zoom button is operated to set the camera to a wide-angle side or telephoto side, the zoom lens 3 is controlled by a motor driver 21 so that optical zooming is performed.

The video signal that has been output from the CCD 5 is converted to digital image data in an analog/digital conversion circuit 6. Image data that has been output from the analog/digital conversion circuit 6 is input to an image input controller 7. Image data that has been output from the image input controller 7 is input to an image signal processing circuit 8, where the image is subjected to prescribed image processing such as a gamma correction and white balance adjustment. The processed image data is then input to a display circuit 10.

The image signal processing circuit 8 also has a function for executing electronic zoom processing (pixel interpolation processing). Electronic zoom also is carried out in accordance with operation of the above-mentioned zoom button.

The image of the subject so-called "through-the-lens image"), which has been captured through the zoom lens 3 and focusing lens 4, is displayed on the display screen of an image display unit (a liquid-crystal monitor, for example) 11 by controlling the image display unit 11 using the display circuit 10.

The image data that has been output from the image input controller 7 is input also to an AE (automatic exposure)/AF (automatic focus) detection circuit 12. In the case of AE detection, the luminance of the image of the subject is calculated based upon the entered image data, the aperture value of an iris (not shown) and the shutter speed of a shutter (not shown) are calculated based upon calculated luminance, and the iris and shutter are controlled. In the case of AF detection, the lens position of the focusing lens 4 is calculated based upon the contrast, etc., of the entered image data. The focusing lens 4 is controlled by a motor driver 22 in such a manner that the focusing lens 4 attains the calculated lens position.

If the shutter-release button is pressed when the imaging mode has been set at the mode selection dial, an image signal representing the image of the subject is output from the COD 5. The image signal is converted to digital image data by the analog/digital conversion circuit 6, the image data is input to the image signal processing circuit 8 via the image input controller 7 and the image signal processing circuit 8 subjects the image data to prescribed image processing. The image data that has been output from the image signal processing circuit 8 is stored temporarily in the memory 14. Image data that has been read out of the memory 14 is input to an image compression/expansion processing circuit 9, where the image data is compressed. The compressed image data is recorded on a recording medium 16, such as a memory card, a media controller 15.

If a playback mode is set at the mode selection dial, compressed image data that has been stored in the recording medium 16 is read out by the media controller 15 and applied to the compression/expansion processing circuit 9. Expanded image data is stored in the memory 14. An image based upon the image data stored in the memory 14 is displayed on the image display unit 11 controlled by the display circuit 10.

The digital camera 1 is further equipped with a super-resolution processing circuit 13. The super-resolution processing circuit 13 subjects image data to noise reduction processing and contour emphasis processing. For example, the super-resolution processing circuit 13 executes noise reduction processing by relying upon smoothing processing using a smoothing filter, and contour emphasis processing for raising the gain of the luminance value of a contour component within the image. Operation of the digital camera 1 inclusive of the image processing by the super-resolution processing circuit 13 will be described later.

Figure 2:
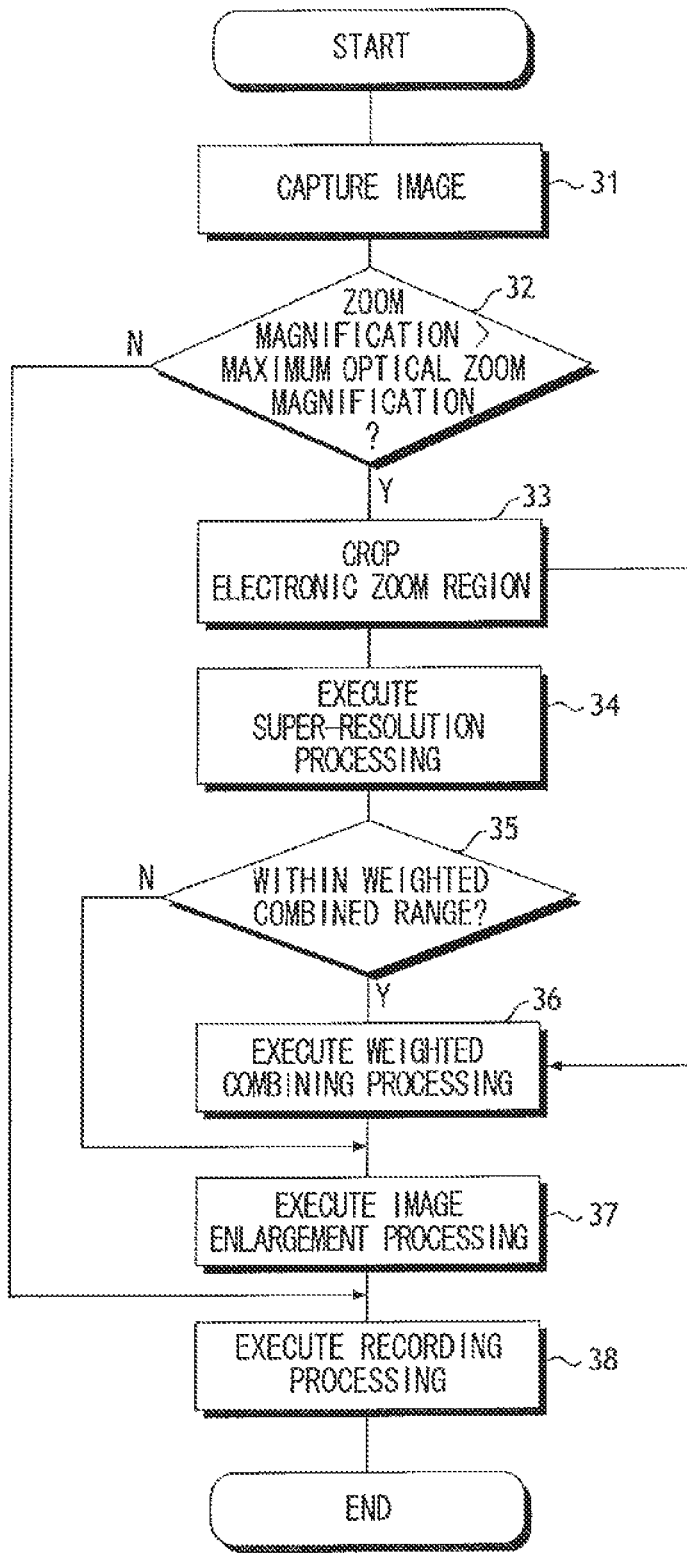
FIG. 2 is a flowchart illustrating the flow of operation of a digital camera according to the first embodiment.
Figure 3:
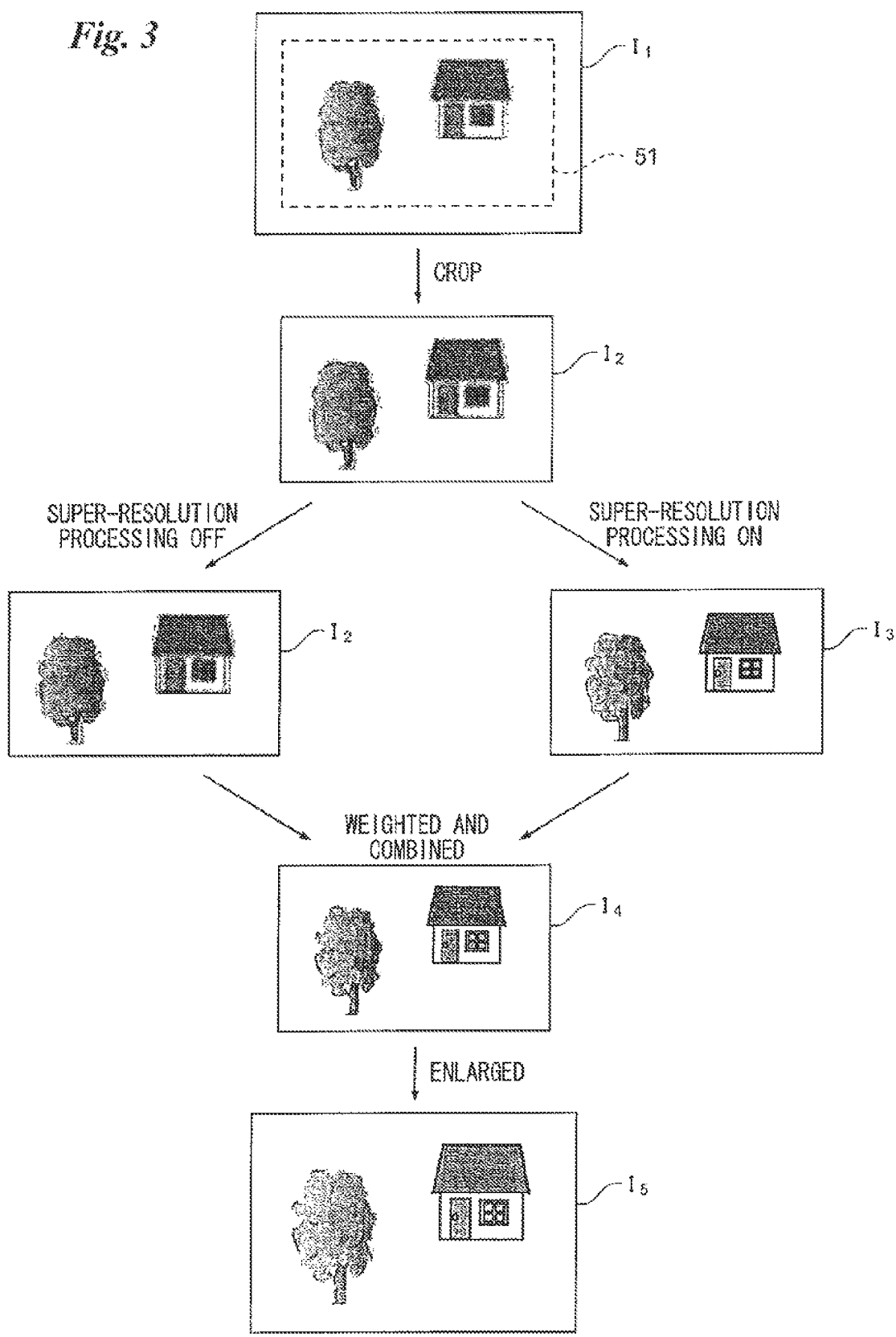
FIG. 3 illustrates the flow of image processing using multiple images.
Figure 4:
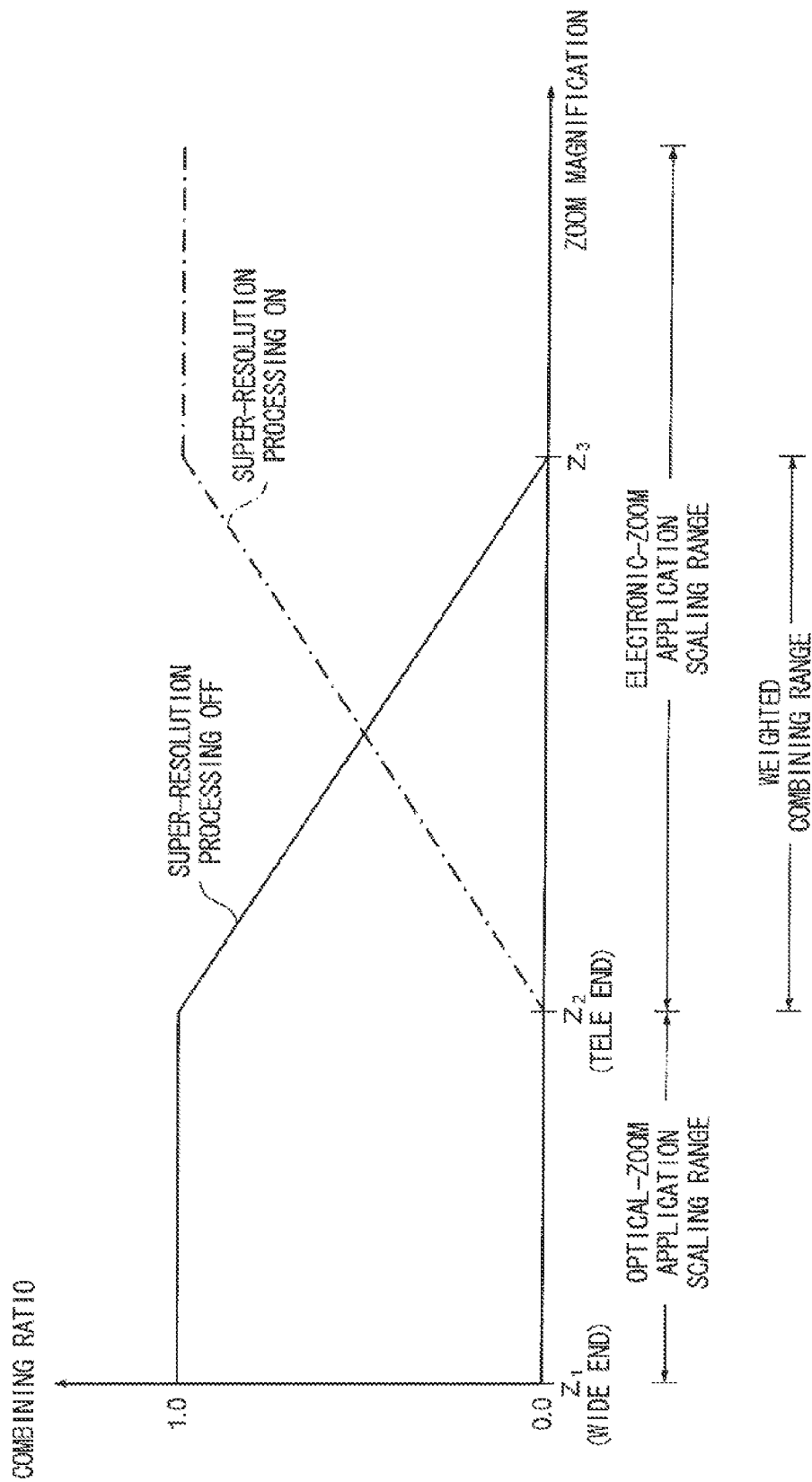
FIG. 4 illustrates the relationship between zoom magnification and processing for combining a super-resolution-processed image (an image for which super-resolution processing is ON) and an image (an image for which super-resolution processing is OFF) that has not been subjected to super-resolution processing.

FIG. 2 is a flowchart illustrating the flow of operation of the digital camera 1, FIG. 3 illustrates the flow of image processing in the flowchart of FIG. 2 by using examples of images, and FIG. 4 illustrates the relationship between zoom magnification, which is the result of zoom processing using the zoom button, and processing for combining an image (an image for which super-resolution processing is ON) that has been subjected to super-resolution processing by the super-resolution processing circuit 13 (described later) and an image (an image for which super-resolution processing is OFF) that has not been subjected to super-resolution processing. The flowchart shown in FIG. 2 will now be described while referring to FIGS. 3 and 4 as appropriate.

If the mode selection dial included in the operating unit 25 is set to the imaging mode, as mentioned above, the image of a subject is captured (step 31).

Zooming of the image of the subject is carried out by pressing the zoom button. In a case where zoom magnification has not reached a zoom magnification (maximum optical zoom magnification) which prevails when the zoom lens 3 is situated at the telephoto end ("TELE END") (see FIG. 4), i.e., if the current zoom magnification resides between a zoom magnification $Z_1$ where the zoom lens 3 is situated at the wide-angle end ("WIDE END") and a maximum optical zoom magnification $Z_2$ where the zoom lens 3 is situated at the telephoto end ("TELE END"), no particular processing is executed. The image data obtained by imaging is recorded in the memory 14 (on the recording medium 16 if the shutter-release button has been pressed) ("NO" at step 32; step 38). The image represented by the image data recorded in the memory 14 can be displayed on the image display unit 11, as mentioned above. At a zoom magnification that has not reached the telephoto end ("TELE END"), electronic zoom processing by the image signal processing circuit 8 is not executed. The current (present-time) zoom magnification is detected by the CPU 2 in accordance with the length of time of depression of the zoom button included in the operating unit 25.

If zoom magnification exceeds the maximum optical zoom magnification $Z_2$ which prevails when the zoom lens 3 is at the telephoto end ("YES" at step 32), electronic zoom processing is executed in addition to optical zoom using the zoom lens 3. Control then proceeds to the processing below.

First, processing for cropping the image data within an electronic zoom region (a range within which size enlargement and reduction is performed in accordance with the current zoom magnification) executed (step 33). Image data representing an image $I_2$ (referred to as a "cropped image $I_2$" below), which represents an electronic zoom region 51 contained in an image $I_1$ representing the entire imaging region, is cropped from the image data representing the image $I_1$.

The image data representing the cropped image $I_2$ is split into two portions (two copies of the image data are made). Data representing one cropped image $I_2$ of these two images is applied to the super-resolution processing circuit 13 and subjected to super-resolution processing (image processing that is a combination of noise reduction processing and contour emphasis processing) (step 34). A super-resolution-processed image (super-resolution-processing ON image) $I_3$ is generated.

It is determined whether the current zoom magnification is within a weighted combining range (step 35).

With reference to FIG. 4, when the current zoom magnification is equal to or greater than the zoom magnification $Z_3$, which exceeds by a prescribed value the maximum optical zoom magnification $Z_2$ which prevails when the zoom lens 3 is at the telephoto end, the super-resolution-processing ON image per se is adopted as the target of display processing. The super-resolution-processing ON image is enlarged (interpolated) to the image size of the imaging region (the original image of the subject) (i.e., the ON image is subjected to electronic zoom processing), and data representing the enlarged super-resolution-processing ON image is recorded in the memory 14 ("NO" at step 35; step 37; step 38). The cropped image that has not been subjected to super-resolution processing (super-resolution-processing OFF image) $I_2$ is not recorded in the memory 14.

On the other hand, if the current zoom magnification is between the zoom magnifications $Z_2$ and $Z_3$ (within the weighted combining range), the super-resolution-processing ON image $I_3$ and the super-resolution-processing OFF image $I_2$, which have been weighted in accordance with the zoom magnification, are combined ("YES" at step 35; step 36). With reference to FIG. 4, the degree of weighting (the combining ratio) of the super-resolution-processing ON image $I_3$ is increased proportionally (see the one-dot chain line) as the zoom magnification increases in the direction from $Z_2$ to $Z_3$. Although the degree of weighting increases proportionally, a non-linear increase is permissible as well. The degree of weighting of the super-resolution-processing OFF image $I_2$, on the other hand, is decreased proportionally (see the solid line) as the zoom magnification increases in the direction from $Z_2$ to $Z_3$. The degree of weighting may also decrease in non-linear fashion. The weighted combining range shown in FIG. 4, data indicating the relationship between zoom magnification and weighting degree (combining ratio) within this range, the scaling range in which optical zoom is applied and the scaling range in which electronic zoom is applied are stored in the memory 14, and this information is used in determining whether the above-described weighted combining processing should be executed or not.

When an optically zoomed image and an electronically zoomed image that has been subjected to super-resolution processing are simply displayed by switching from the former to the latter with the zoom magnification $Z_2$ serving as a threshold value, the continuity of resolution of the image visually recognized is not maintained. Accordingly, as shown in FIG. 4, in the interval from zoom magnification $Z_2$ to $Z_3$, the weighted and combined image is displayed and the weighting of the super-resolution-processing ON image is gradually enlarged (the weighting of the super-resolution-processing OFF image is gradually reduced) as the zoom magnification increases, thereby suppressing a sudden fluctuation in resolution. Thus the photographer is allowed to visually recognize a zoomed image exhibiting resolution having good continuity during the zooming operation. Further, since resolution that declines with an increase in zoom magnification is compensated for by gradually enlarging the weight of the super-resolution-processing ON image in the weighted combining image, the photographer is allowed to visually recognize an image of comparatively constant resolution over the full range of zooming operations.

In a case where weighted combining processing has been executed (image $I_4$ shown in 3) as well, the combined image is subjected to enlargement processing (electronic zoom processing) and data representing the enlarged combined image (image $I_5$ in FIG. 3) is recorded in the memory 14 (steps 37 and 38).

Second Embodiment

Figure 5:
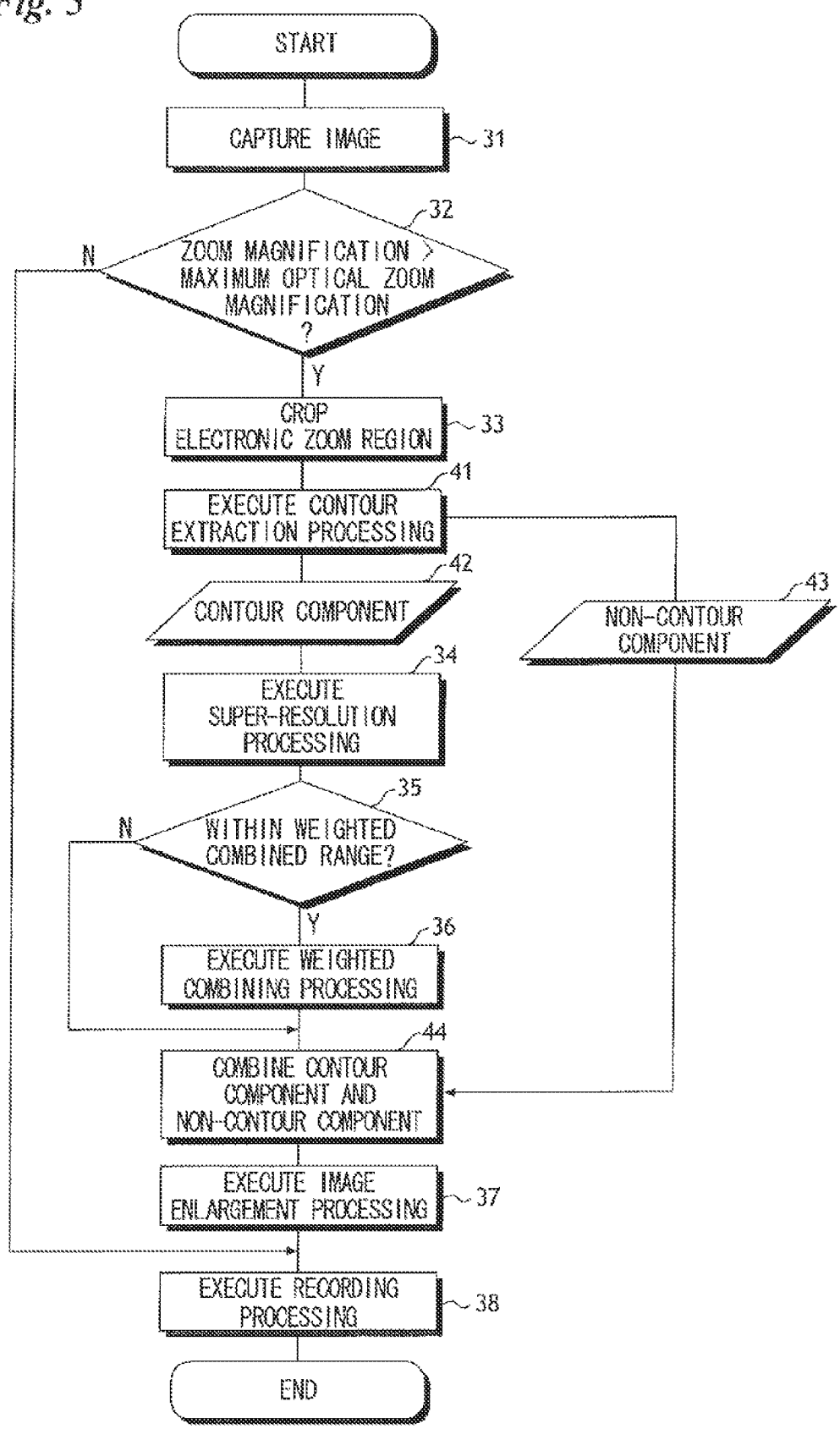
FIG. 5 is a flowchart illustrating the flow of operation of a digital camera according to a second embodiment of the present invention.

FIG. 5 is a flowchart illustrating the flow of operation of a digital camera according to a second embodiment of the present invention. Processing steps in FIG. 5 identical with those shown in the flowchart (FIG. 2) of the digital camera 1 in the first embodiment are designated by like step numbers and need not be described again. The hardware configuration of the digital camera in the second and other embodiments, described later, is the same as that of the first embodiment (FIG. 1).

The super-resolution processing executed by the super-resolution processing circuit 13 in the above-described first embodiment is applied to image data obtained by imaging. In the second embodiment, contour extraction processing is executed before super-resolution processing and only an extracted contour portion is subjected to processing by the super-resolution processing circuit 13.

With reference to FIG. 5, the cropped image is subjected to contour extraction processing (contour-component separation processing) in the super-resolution processing circuit 13 (step 41), image data representing the contour component is generated (step 42) and image data representing the non-contour component is generated (step 43).

The super-resolution processing circuit 13 subjects only the contour-component image data to super-resolution processing (step 34). If the current zoom magnification is within the weighted combining range (zoom magnifications $Z_2$ to $Z_3$ in FIG. 4), the super-resolution-processing ON image and the super-resolution-processing OFF image are weighted and combined ("YES" at step 35; step 36). If the current zoom magnification exceeds the weighted combining range (i.e., is greater than zoom magnification $Z_3$), then weighted combining is not carried out ("NO" at step 35).

Image data of the super-resolution-processed contour component or image data of the weighted and combined contour component is combined with the image data of the non-contour component (step 44). The combined image data is recorded in the memory 14 following execution of image enlargement processing (steps 37 and 38).

Since only the image data of the contour component is subjected to super-resolution processing in the super-resolution processing circuit 13, the time needed for processing in the super-resolution processing circuit 13 can be shortened in comparison with the first embodiment. Further, since it is possible to subject only the contour component to super-resolution processing, an advantage acquired is that false contours do not occur or hardly occur in comparison with a case where the entire image is subjected to super-resolution processing.

Third Embodiment

In the first and second embodiments set forth above, the maximum optical zoom magnification $Z_2$ which prevails when the zoom lens 3 is situated at the telephoto end ("TELE END") is adopted as the zoom magnification (minimum zoom magnification of the weighted combining range) at which weighted combining processing is started. However, there are occasions where, even if electronic zoom processing is executed, a satisfactory resolution is maintained in a state in which the zoom magnification is low. In a third embodiment, as will be described below, instead of adopting the maximum optical zoom magnification $Z_2$ which prevails when the zoom lens 3 is situated at the telephoto end ("TELE END") as the zoom magnification at which weighted combining processing is started, a zoom magnification that starts weighted combining processing is decided taking spatial frequency response into consideration.

Figure 6:
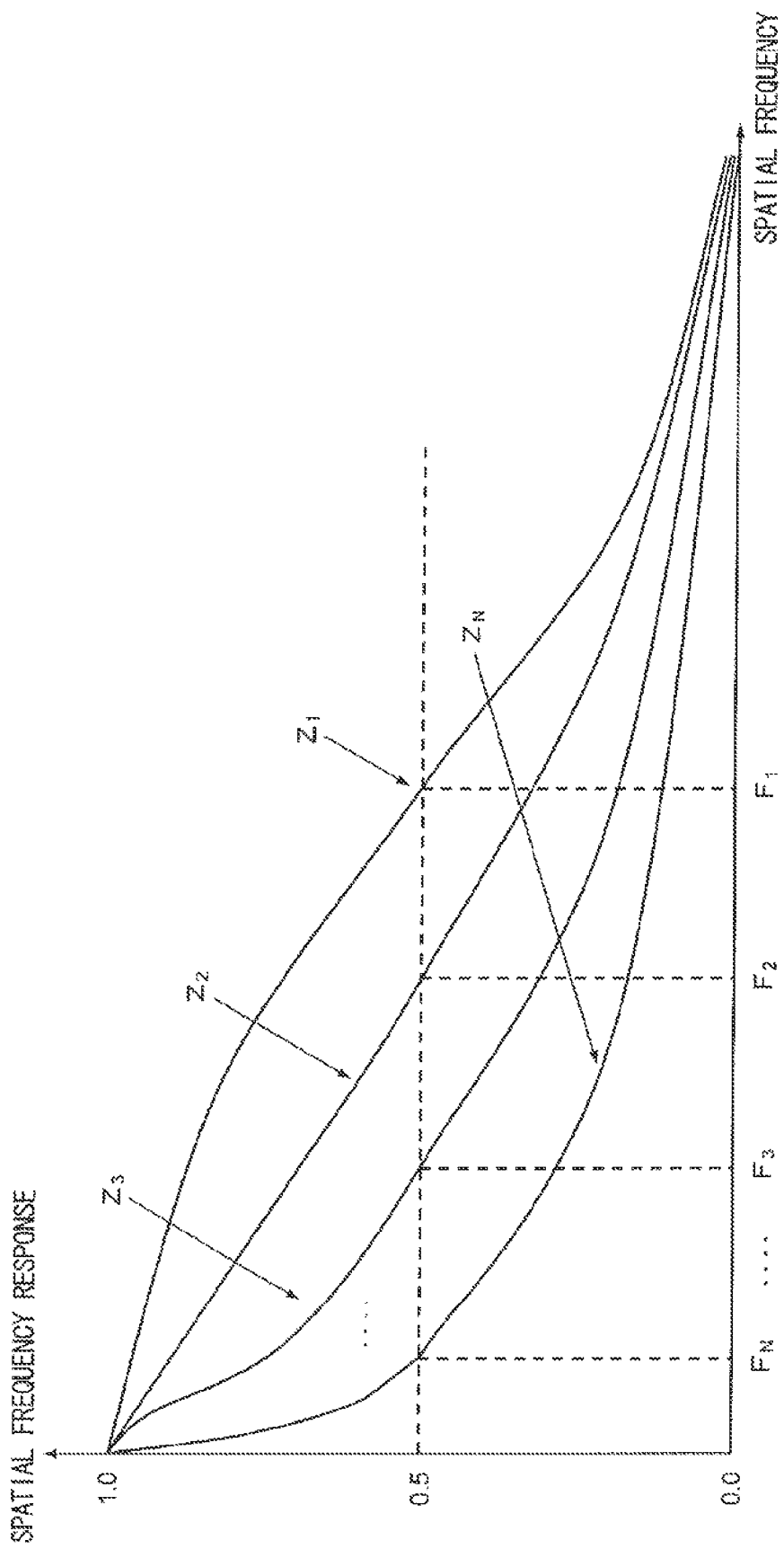
FIG. 6 is a graph illustrating the spatial frequency response of a digital camera.

FIG. 6 is a graph illustrating the characteristic of the spatial frequency response of the digital camera 1, in which the horizontal axis is a plot of spatial frequency and the vertical axis a plot of spatial frequency response. The spatial frequency response is determined by the characteristics of the digital camera 1 (characteristics such as the optical characteristic of the zoom lens 3, the characteristic of the CPU 2 and the image processing characteristic at the time of electronic zoom) and the zoom magnification. In FIG. 6 the graph shows characteristics of spatial frequency response when the respective zoom magnifications are $Z_1$, $Z_2$, $Z_3$ and $Z_N$ ($Z_1 < Z_2 < Z_3 < Z_N$).

It will be understood from FIG. 6 that, for all zoom magnifications, the higher the spatial frequency of an image, the lower the spatial frequency response.

FIG. 6 illustrates spatial frequencies $F_1$, $F_2$, $F_3$, $F_N$ ($F_1 > F_2 > F_3 > F_N$) at which the spatial frequency response is a 50% response when the zoom magnifications are $Z_1$, $Z_2$, $Z_3$ and $Z_N$, respectively. It be understood that the higher the zoom magnification, the lower the spatial frequency at which the spatial frequency response is the 50% response.

Figure 7:
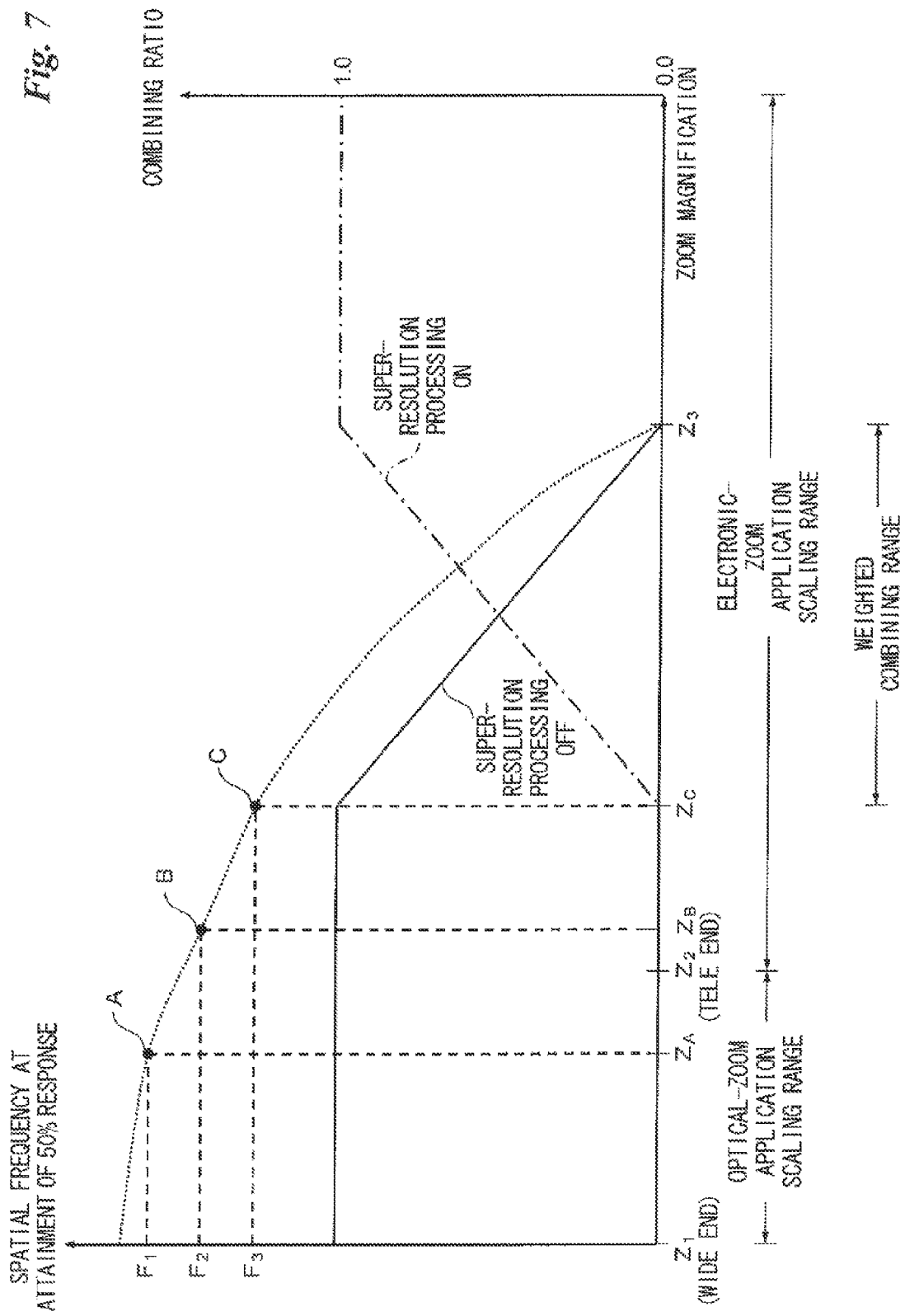
FIG. 7, which shows a third embodiment of the present invention, illustrates the relationship between zoom magnification and processing for combining a super-resolution-processed image (an image for which super-resolution processing is ON) and an image that has not been subjected to super-resolution processing (an image for which super-resolution processing is OFF)

FIG. 7 is a diagram illustrating the relationship between zoom magnification and weighted combining in addition to a curve (see the fine dotted line) indicating spatial frequency at which the spatial frequency response is the 50% response. As shown in FIG. 7, the spatial frequency at which the spatial frequency response takes on the 50% response declines as zoom magnification increases.

With reference to FIG. 7, consider, by way of example, that the spatial frequency $F_3$ is taken as the reference to serve as the spatial frequency at which the spatial frequency response is the 50% response. In a case where a spatial frequency response greater than the 50% response is imparted with regard to the reference spatial frequency $F_3$, it will suffice if zoom magnification is less than a zoom magnification $Z_C$ that is greater than the maximum optical zoom magnification $Z_2$ (see a point C on the curve indicating the spatial frequency at which the spatial frequency response takes on the 50% response).

In a case where the spatial frequency $F_2$ higher than the spatial frequency $F_3$ is adopted as the reference spatial frequency and a spatial frequency response greater than the 50% response is imparted with regard to the reference spatial frequency it will suffice if zoom magnification greater than the maximum optical zoom magnification $Z_2$ and less than the zoom magnification (see a point B).

Furthermore, in a case where the spatial frequency $F_1$ higher than the spatial frequency $F_2$ is adopted as the reference spatial frequency and a spatial frequency response greater than the 50% response is imparted with regard to the reference spatial frequency it is required that the zoom magnification be less than the zoom magnification $Z_A$, which is smaller than the maximum optical zoom magnification $Z_2$.

In the third embodiment (FIG. 7), instead of adopting the maximum optical zoom magnification $Z_2$ which prevails when the zoom lens 3 is situated at the telephoto end as the zoom magnification at which weighted combining starts, a spatial frequency (reference spatial frequency) at which the spatial frequency response takes on the 50% response is decided beforehand and data representing a zoom magnification at which the above-mentioned spatial frequency response takes on the 50% with regard to this reference spatial frequency is stored beforehand the memory 14. Super-resolution processing (weighted combining) is carried out when a detected zoom magnification is greater than the zoom magnification at which the spatial frequency response takes on the 50% response.

If it is arranged so that super-resolution processing (weighted combining) is carried out when a detected zoom magnification is in the electronic-zoom application scaling range but is not carried out when a detected zoom magnification is in the optical-zoom application scaling range, then it will suffice to decide upon a comparatively low spatial frequency as the reference spatial frequency ($F_2$, $F_3$ in FIG. 7, for example) and store data, which represents zoom magnification ($Z_B$, $Z_C$) at which the spatial frequency response takes on the 50% response with regard to this reference spatial frequency, in the memory 14 beforehand. It is of course possible to execute super-resolution processing from the optical-zoom application scaling range. In such case it would suffice to decide upon a comparatively high spatial frequency as the reference spatial frequency ($F_1$ in FIG. 7, for example) and store the zoom magnification $Z_A$ (the zoom magnification at which the spatial frequency response takes on the 50% response with regard to the reference spatial frequency $F_1$), which is smaller than the maximum optical zoom magnification $Z_2$, in the memory 14 beforehand as the zoom magnification at which super-resolution processing (weighted combining) starts.

Fourth Embodiment

FIG. 8, which shows a fourth embodiment of the present invention, illustrates the relationship between zoom magnification based upon zoom processing using the zoom button and processing for combining a super-resolution-processed image (an image for which super-resolution processing is ON) and an image that has not been subjected to super-resolution processing (an image for which super-resolution processing is OFF).

By changing the filter coefficients of a filter used in noise reduction processing and the gain value used in contour emphasis processing, the strength (degree) of super-resolution processing can be adjusted. In the fourth embodiment, two super-resolution processing operations of different degree are used.

With reference to FIG. 8, if, by way of example, the current zoom magnification is within a range (a weighted combining range I) extending from the maximum optical zoom magnification $Z_2$, at which the zoom lens 3 is situated at the telescopic end, to the zoom magnification $Z_3$, then super-resolution processing of weak strength ["SUPER-RESOLUTION PROCESSING (WEAK)"] is executed in the super-resolution processing circuit 13. The result of weighting and combining a super-resolution-processing OFF image (the solid line) and a super-resolution-processing ON (weak) image (the one-dot chain line) is recorded in the memory 14.

If the current zoom magnification is within a range extending from $Z_3$ to $Z_4$, then the super-resolution-processing ON image of weak strength is subjected to enlargement processing and the result is then stored in the memory 14.

If the current zoom magnification is within a range extending from $Z_4$ to $Z_5$ (a weighted combining range II), then the super-resolution processing circuit 13 generates two super-resolution-processed images, namely an image that has been subjected to super-resolution processing of weak strength ["SUPER-RESOLUTION-PROCESSING ON (WEAK) IMAGE")] (the one-dot chain line) and an image that has been subjected to super-resolution processing of high strength ["SUPER-RESOLUTION-PROCESSING ON (STRONG) IMAGE")] (the two-dot chain line), and weights and combines these two images. The magnitude of weighting of the super-resolution-processing ON (strong) image increases proportionally as the zoom magnification increases in the direction from $Z_4$ to $Z_5$. On the other hand, the magnitude of weighing of the super-resolution-processing ON (weak) image decreases proportionally as the zoom magnification increases in the direction from $Z_4$ to $Z_5$. The result of weighting and combing the super-resolution-processing ON (weak) image and the super-resolution-processing ON (strong) image is recorded in the memory 14 upon being subjected to enlargement processing.

If the current zoom magnification is greater than $Z_5$, then the super-resolution-processing ON (strong) image is recorded in the memory 14 upon being subjected to enlargement processing.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
    an image sensing device for imaging a subject through a zoom lens, which is capable of optically scaling a light image, and outputting image data representing the image of the subject;
    an electronic zoom device for electronically scaling the image data obtained by said image sensing device;
    a zoom operating device for performing an operation for changing zoom magnification of the zoom lens and of said electronic zoom device;
    a zoom control device for scaling the image data using only the zoom lens if zoom magnification is within an optical-zoom application scaling range that extends up to a maximum optical zoom magnification which prevails when the zoom lens is situated at a telephoto end, and making joint use of said electronic zoom device if zoom magnification is within an electronic-zoom application scaling range that exceeds the maximum optical zoom magnification;
    a super-resolution processing device for subject the image data to super-resolution processing that emphasizes contours while suppressing emphasis of noise, thereby generating super-resolution image data; and
    a weighted combining device for combining the generated super-resolution image data and image data, which has not been subjected to super-resolution processing, by weighting processing executed such that the higher the zoom magnification, the greater the weight assigned to the super-resolution image data, this being performed when the zoom magnification is within the electronic-zoom application scaling range.

2. The apparatus according to claim 1, further comprising a recording control device operable if zoom magnification is within the optical-zoom application scaling range for recording in a recording device image data that has been optically scaled to the zoom magnification and not subjected to super-resolution processing, and operable if zoom magnification is within the electronic-zoom application scaling range for recording in the recording device the weighted and combined image data upon electronically scaling this weighted and combined image data to the zoom magnification.

3. The apparatus according to claim 2, wherein said weighted combining device subjects super-resolution image data and image data that has not been subjected to super-resolution processing to weighting processing when zoom magnification is within a range extending from the maximum optical zoom magnification to a first zoom magnification that exceeds the maximum optical zoom magnification; and
    said recording control device is operable if zoom magnification is within the range extending from the maximum optical zoom magnification to the first zoom magnification for recording in the recording device the weighted and combined image data upon electronically scaling this weighted and combined image data to the zoom magnification, and operable in a case where zoom magnification exceeds the first zoom magnification for recording in the recording device the super-resolution image data upon electronically scaling this weighted and combined image data to the zoom magnification.

4. The apparatus according to claim 2, wherein said super-resolution processing device executes first and second super-resolution processing operations having different degrees of super-resolution processing;
    said weighted combining device weights and combines super-resolution image data resulting from the first super-resolution processing operation and image data, which has not been subjected to super-resolution processing, by weighting processing executed such that the higher the zoom magnification, the greater the weight assigned to the super-resolution image data, this being performed if the zoom magnification is within a range extending from the maximum optical zoom magnification to a first zoom magnification that exceeds the maximum optical zoom magnification, and weights and combines super-resolution image data resulting from the first super-resolution processing operation and super-resolution image data resulting from the second super-resolution processing operation, the strength of which is greater than that of the first super-resolution processing operation, by weighting processing executed such that the higher the zoom magnification, the greater the weight assigned to the super-resolution image data resulting from the second super-resolution processing operation, this being performed if the zoom magnification is within a range extending from a second zoom magnification that exceeds the first zoom magnification to a third zoom magnification that exceeds the second zoom magnification; and said recording control device is operable if zoom magnification is within the range extending from the maximum optical zoom magnification to the first zoom magnification for recording in the recording device the image data, which has been obtained by weighting and combining the super-resolution image data resulting from the first super-resolution processing operation and the image data that has not been subjected to super-resolution processing, upon electronically scaling this weighted and combined image data to the zoom magnification; is operable if zoom magnification is within the range extending from the first zoom magnification to the second zoom magnification for recording in the recording device the super-resolution image data resulting from the first super-resolution processing operation upon electronically scaling this weighted and combined image data to the zoom magnification; is operable if zoom magnification is within the range extending from the second zoom magnification to the third zoom magnification for recording the recording device image data, which has been obtained by weighting and combining the super-resolution image data resulting from the first super-resolution processing operation and the image data resulting from the second super-resolution processing operation upon electronically scaling this weighted and combined image data to the zoom magnification; and is operable in a case where zoom magnification exceeds the third zoom magnification for recording in the recording device the super-resolution image data resulting from the second super-resolution processing operation upon electronically scaling this weighted and combined image data to the zoom magnification.

5. The apparatus according to claim 1, further comprising a super-resolution processing control device for controlling said super-resolution processing device so as so not execute super-resolution processing zoom magnification is within the optical-zoom application scaling range and to subject image data to super-resolution processing when zoom magnification is within the electronic-zoom application scaling range.

6. The apparatus according to claim 5, wherein said super-resolution processing control device controls said super-resolution processing device in such a manner that image data is subjected to super-resolution processing when zoom magnification is equal to or greater than a minimum zoom magnification of the electronic-zoom application scaling range.

7. The apparatus according to claim 1, further comprising a weighted combining control device for controlling said weighted combining device such that super-resolution image data is not combined if zoom magnification is equal to or less than a prescribed zoom magnification, even if the zoom magnification is within the electronic-zoom application scaling range, and such that super-resolution image data is combined when zoom magnification is greater than the prescribed zoom magnification.

8. The apparatus according to claim 7, wherein the prescribed zoom magnification is one at which a spatial frequency response at a predetermined reference spatial frequency takes on a prescribed value.

9. The apparatus according to claim 1, wherein said super-resolution processing device includes:
   a separation device for separating an image, which is represented by image data, into a contour component and a non-contour component;
   a contour contour-component processing device for applying noise reduction processing and emphasis processing to the contour component into which the image is separated by said separation device; and
   a combining device for combining the contour component, which has undergone noise reduction processing and emphasis processing, with the non contour component.

10. An image sensing apparatus comprising:
   an image sensing device for imaging a subject through a zoom lens, which is capable of optically scaling a light image, and out putting image data representing the image of the subject;
   an electronic zoom device for electronically scaling the image data obtained by said image sensing device;
   a zoom operating device for performing an operation for changing zoom magnification of the zoom lens and of said electronic zoom device;
   a zoom control device for scaling the image data using only the zoom lens if zoom magnification is within an optical-zoom application scaling range that extends up to a maximum optical zoom magnification which prevails when the zoom lens is situated at a telephoto end, and making joint use of said electronic zoom device if zoom magnification is within an electronic-zoom application scaling range that exceeds the maximum optical zoom magnification;
   a super-resolution processing device for subjecting the image data to super-resolution processing that emphasizes contours while suppressing emphasis of noise, thereby generating super-resolution image data;
   a weighted combining device for combining the generated super-resolution image data and image data, which has not been subjected to super-resolution processing, by weighting processing executed such that the higher the zoom magnification, the greater the weight assigned to the super-resolution image data; and
   a recording control device for recording in a recording device image data that has been scaled to the zoom magnification and not subjected to super-resolution processing, this being performed if zoom magnification is equal to or less than a zoom magnification at which a spatial frequency response, which is decided by characteristics of said image sensing apparatus and the zoom magnification, takes on a prescribed value with regard to a predetermined standard spatial frequency, and for recording in the recording device image data, which has been obtained by weighting and combining the super-resolution image data and the image data that has not been subjected to super-resolution processing, upon scaling this weighted and combined image data to the zoom magnification, this being performed in a case where zoom magnification is greater than the zoom magnification at which the spatial frequency response takes on the prescribed value.

11. A method of controlling an image sensing apparatus having an image sensing device for imaging a subject through a zoom lens, which is capable of optically scaling a light image, and outputting image data representing the image of the subject; an electronic zoom device for electronically scaling the image data obtained by the image sensing device; a zoom operating device for performing an operation for changing zoom magnification of the zoom lens and of the electronic zoom device; a zoom control device for scaling the image data using only the zoom lens if zoom magnification is within an optical-zoom application scaling range that extends up to a maximum optical zoom magnification which prevails when the zoom lens is situated at a telephoto end, and making joint use of the electronic zoom device if zoom magnification is within an electronic-zoom application scaling range that exceeds the maximum optical zoom magnification; and a super-resolution processing device for subjecting the image data to super-resolution processing that emphasizes contours while suppressing emphasis of noise, thereby generating super-resolution image data;

said method having a step of combining the generated super-resolution image data and image data, which has not been subjected to super-resolution processing, by weighting processing executed such that the higher the zoom magnification, the greater the weight assigned to the super-resolution image data, this being performed when the zoom magnification is within the electronic-zoom application scaling range.

12. The method according to claim 11, further having a step of recording in a recording device image data that has been optically scaled to the zoom magnification and not subjected to super-resolution processing, this being performed if zoom magnification is within the optical-zoom application scaling range, and recording in the recording device the weighted and combined image data upon electronically scaling this weighted and combined image data to the zoom magnification, this being performed if zoom magnification is within the electronic-zoom application scaling range.

13. A method of controlling an image sensing apparatus having an image sensing device for imaging a subject through a zoom lens, which is capable of optically scaling a light image, and outputting image data representing the image of the subject; an electronic zoom device for electronically scaling the image data obtained by the image sensing device; a zoom operating device for performing an operation for changing zoom magnification of the zoom lens and of the electronic zoom device; a zoom control device for scaling the image data using only the zoom lens if zoom magnification is within an optical-zoom application scaling range that extends up to a maximum optical zoom magnification which prevails when the zoom lens is situated at a telephoto end, and making joint use of the electronic zoom device if zoom magnification is within an electronic-zoom application scaling range that exceeds the maximum optical zoom magnification; and a super-resolution processing device for subjecting the image data to super-resolution processing that emphasizes contours while suppressing emphasis of noise, thereby generating super-resolution image data;

said method having steps of:
combining the generated super-resolution image data and image data, which has not been subjected to super-resolution processing, by weighting processing executed such that the higher the zoom magnification, the greater the weight assigned to the super-resolution image data; and
recording in a recording device image data that has been scaled to the zoom magnification and not subjected to super-resolution processing, this being performed if zoom magnification is equal to or less than a zoom magnification at which a spatial frequency response, which is decided by characteristics of said image sensing apparatus and the zoom magnification, takes on a prescribed value with regard to a predetermined standard spatial frequency, and recording in the recording device image data, which has been obtained by weighting and combining the super-resolution image data and the image data that has not been subjected to super-resolution processing, upon scaling this weighted and combined image data to the zoom magnification, this being performed in a case where zoom magnification is greater than the zoom magnification at which the spatial frequency response takes on the prescribed value.

* * * * *